United States Patent
Ahn et al.

(10) Patent No.: US 10,867,523 B2
(45) Date of Patent: Dec. 15, 2020

(54) METHOD FOR INDICATING CHARACTERISTIC OF PROBLEM AND PROBLEM SET

(71) Applicant: VITRUV INC., Seoul (KR)

(72) Inventors: MyungHoon Ahn, Gyeonggi-do (KR); Tae Hyoung Oh, Seoul (KR); Du Seop Jung, Gyeonggi-do (KR); Se Hoon Gihm, Seoul (KR)

(73) Assignee: VITRUV INC., Seoul (KR)

( * ) Notice: Subject to any disclaimer, the term of this patent is extended or adjusted under 35 U.S.C. 154(b) by 240 days.

(21) Appl. No.: 15/676,434

(22) Filed: Aug. 14, 2017

(65) Prior Publication Data

US 2018/0025654 A1    Jan. 25, 2018

Related U.S. Application Data

(63) Continuation of application No. PCT/KR2015/006331, filed on Jun. 22, 2015.

(30) Foreign Application Priority Data

Feb. 12, 2015  (KR) ........................ 10-2015-0021317

(51) Int. Cl.
*G09B 3/02* (2006.01)
*G09B 19/00* (2006.01)
*G09B 5/02* (2006.01)

(52) U.S. Cl.
CPC ............... *G09B 3/02* (2013.01); *G09B 19/00* (2013.01); *G09B 5/02* (2013.01)

(58) Field of Classification Search
None
See application file for complete search history.

(56) References Cited

PUBLICATIONS

International Search Report issued in PCT/KR2015/006331 dated Oct. 8, 2015, 2 pages.

*Primary Examiner* — James B Hull
(74) *Attorney, Agent, or Firm* — Dinsmore & Shohl LLP; Yongsok Choi, Esq.

(57) ABSTRACT

Method for indicating characteristic of problem set including a plurality of problems is provided. The method comprises a step of determining characteristics of problems, wherein characteristic of each problem included in said problem set is determined by attributes related with each problem and correlations between said attributes; and a step of determining characteristic of problem set, wherein characteristic of problem set is determined as a union of characteristics of all problems included in said problem set, and said characteristic of problem set is determined by attributes related with all problems and correlations between said attributes.

12 Claims, 21 Drawing Sheets

[Population]
    1st to 5th attributes

[1st problem]
    1st and 2nd attributes
    1st attribute − 2nd attribute

[2nd problem]
    1st to 3rd attributes
    1st attribute − 2nd attribute
    2nd attribute − 3rd attribute

[3rd problem]
    1st to 3rd attributes
    1st attribute − 2nd attribute

[problem set]
    1st and 2nd attributes
    1st to 3rd attributes
    1st to 3rd attributes 1st attribute − 2nd attribute
    1st attribute − 2nd attribute
    2nd attribute − 3rd attribute
    1st attribute − 2nd attribute

FIG. 4

[Population]
    1st to 5th attributes

[1st problem] – wrong solution
    1st and 2nd attributes
    1st attribute – 2nd attribute

[2nd problem] – wrong solution
    1st to 3rd attributes
    1st attribute – 2nd attribute[right solution]
    2nd attribute – 3rd attribute[wrong solution]

[3rd problem] – right solution
    1st to 3rd attributes
    1st attribute – 2nd attribute[right solution]

[problem set]
        1st and 2nd attributes
        1st to 3rd attributes
        1st to 3rd attributes 1st attribute – 2nd attribute[wrong solution]
    1st attribute – 2nd attribute[right solution]
    2nd attribute – 3rd attribute[wrong solution]
    1st attribute – 2nd attribute[right solution]

FIG. 13

METHOD FOR INDICATING CHARACTERISTIC OF PROBLEM AND PROBLEM SET

CROSS-REFERENCE TO RELATED APPLICATIONS

This application is a continuation application of Patent Cooperation Treaty (PCT) international application Serial No. PCT/KR2015/006331, filed on Jun. 22, 2015, and which designates the United States, which claims priority to Korean Patent Application Serial No. 10-2015-0021317, filed on Feb. 12, 2015. The entire contents of PCT international application Serial No. PCT/KR2015/006331, and Korean Patent Application Serial No. 10-2015-0021317 are hereby incorporated by reference.

TECHNICAL FIELD

The present invention relates to a method for indicating characteristic of problem and problem set, more particularly, to a method for indicating characteristic of problem and problem set, wherein characteristic of problem and problem set can be determined and can be visualized.

BACKGROUND OF INVENTION

Learning through problem solving and status evaluation through problem solving are one of the most widely used learning methods to gauge learner's understanding after a learner learns new knowledge.

However, in order to effectively use the results of problem solving, it should be noted what is the weak point of the learner through relevant problems. For this, some workbooks describe which concept or which chapter each problem is based on.

Accordingly, learners solve problems, and then, they can note on which concept or on which chapter they have weak understanding through the concept and relevant information of such concept, which are related with the problems to which they made wrong answers. Learners can effectively supplement weak points through proceeding additional learning with respect to the noted weak concept or noted weak chapter.

SUMMARY

Basic level problems are made based on only one concept, thus they can be solved through learning one chapter. However, applied or advanced problems are made based on a plurality of concepts and chapters.

Conventionally, problems made based on a plurality of concepts and chapters, were simply indicated as being based on concept or chapter, which is learned at the very last in a general course of study. Therefore, according to such prior art, learners could only obtain a simplified information regarding problems, and it was not easy to obtain a precise feedback.

For example, in case a learner solves a math problem indicated as being related to an integral calculus but makes a wrong answer due to a wrong understanding regarding a geometry, it can be noted that the learner lacks understanding on the integral calculus, which is learned after the geometry.

Further, according to prior art, learners were provided with a simple list of concepts and chapters related with problems, thus learners could obtain just a fragmentary information related with problems. Furthermore, according to prior art, it was not easy for learners to note overall characteristic (or tendency) of a set of a plurality of problems such as a college scholastic ability test or a mock examination.

As described above, because it was not easy to obtain precise information on characteristic of each problem according to prior art, it was not easy to obtain precise information on overall characteristic of a problem set, in which each problem contains a plurality of concepts variously.

For example, in case of a college scholastic ability test, the proportion among chapters has been maintained similarly every year, thus it can be analyzed that most college scholastic ability tests have similar characteristics when using prior art analysis method. However, the college scholastic ability test actually has different characteristic year by year, thus the analysis using prior art method cannot have high reliability.

Even in the case that the above-described simplified indication is not conducted with respect to problems made based on a plurality of concepts or chapters in prior art, the characteristic of a problem set can be a mere aggregation of concepts or chapters, on which each problem is based, according to prior art. According to such prior art, in the process of analyzing characteristic of a problem set, it is hard to distinguish problem 1, which is based on two combined concepts of limit and similarity of figures, from problem 2, which is based on separate concepts of limit and similarity of figures, thus precise analysis is hard to achieve.

An objective of present invention, which starts from recognition of above-described prior art problems, is to provide method for indicating characteristic of problem and problem set, in which characteristic of problem and problem set can be precisely noted using correlations between attributes.

A different objective of present invention is to provide method for indicating characteristic of problem and problem set, in which characteristic of problem and problem set can be visualized by indicating attributes as points and indicating correlations between attributes as lines.

A further different objective of present invention is to provide method for indicating characteristic of problem and problem set, in which the appearance of a point corresponding to a specific attribute becomes different according to frequency of accumulation of the specific attribute, and the appearance of a line corresponding to a specific correlations between attributes becomes different according to frequency of accumulation of the specific correlations between attributes, when the attributes are indicated as points and the correlations between attributes are indicated as lines.

A further different objective of present invention is to provide method for indicating characteristic of problem and problem set, in which the correlations between attributes related with characteristics of problems to which a learner makes a right answer is indicated as a different line in appearance from the correlations between attributes related with characteristics of problems to which a learner makes a wrong answer.

A further different objective of present invention is to provide method for indicating characteristic of problem and problem set, in which locations of points corresponding to specific attributes are fixed or variable on a screen, in case points corresponding to attributes are displayed on a screen.

Technical objectives of the present invention are not limited to the above-described objectives, and another technical objectives will be able to be clearly understood by a person skilled in the art with reference to the following description.

The method for indicating characteristic of problem set including a plurality of problems according to one embodiment of the present invention, which is for solving the above-described technical objectives, comprises a step of determining characteristics of problems, wherein characteristic of each problem included in said problem set is determined by attributes related with each problem and correlations between said attributes; and a step of determining characteristic of problem set, wherein characteristic of problem set is determined as a union of characteristics of all problems included in said problem set, and said characteristic of problem set is determined by attributes related with all problems and correlations between said attributes.

The method for indicating characteristic of problem according to one embodiment of the present invention, which is for solving the above-described technical objectives, comprises a step of determining characteristic of problem, wherein said characteristic of problem is determined by attributes related with said problem and correlations between said attributes; and a step of visualizing said determined characteristic of said problem on a screen, wherein said attributes included in said determined characteristic of said problem are indicated as points, and said correlations between said attributes are indicated as lines on a screen.

According to the above technical means of the present invention, since the characteristic of problem and the characteristic of problem set are indicated using the attributes and correlations between attributes, the characteristic of problem and the characteristic of problem set can be precisely indicated.

Also, according to the present invention, since the attributes are indicated as points and the correlations between the attributes are indicated as lines, the characteristic of problem and the characteristic of problem set can be visualized, and it becomes easy to understand the characteristic of problem and the characteristic of problem set.

Also, according to the present invention, a learning history of a learner, who proceeds his or her learning through problem solving, can be managed, and the learner's weak points can be analyzed, and effectively visualized.

In addition, according to the present invention, when the points corresponding to the attributes are indicated on a screen in order to visualize the characteristic of problem or the characteristic of problem set, the locations of points corresponding to specific attributes can be fixed or variable. Therefore, a visualization of the characteristic of problem and the characteristic of problem set, which covers various purposes of visualization, becomes possible.

DESCRIPTIONS OF DRAWINGS

FIG. 4 is a drawing for explaining the problem set characteristic determining step (S30) of FIG. 1.

Figure 1:
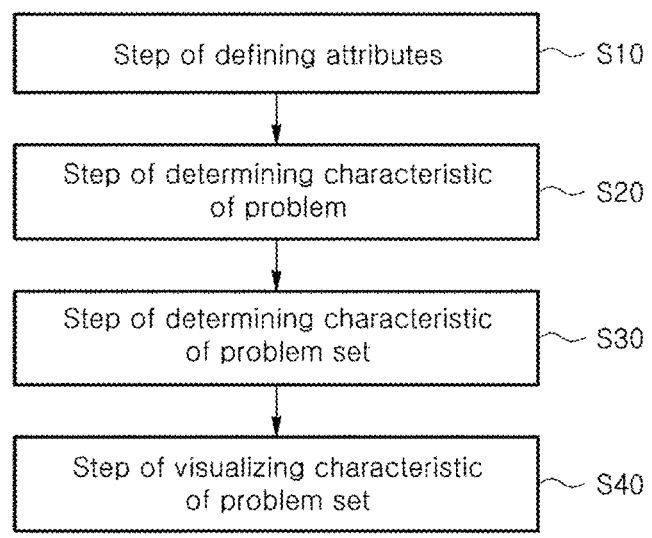
FIG. 1 is a flow chart of the method for indicating characteristic of problem set according to the first embodiment of the present invention.

FIGS. 7, 8a, 8b, and 8c depict specific examples of the screens visualized according to the visualization step of problem set's characteristic (S40) of FIG. 1.

Figure 9:
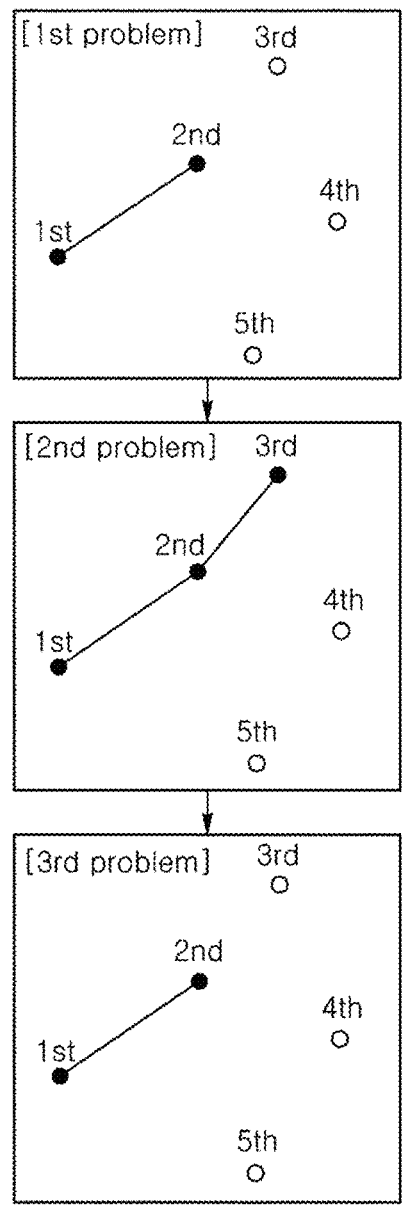

FIG. 9 depicts a screen visualized according to the visualization step of problem set's characteristic (S40) in the method for indicating characteristic of problem set according to the second embodiment of the present invention.

Figure 10:
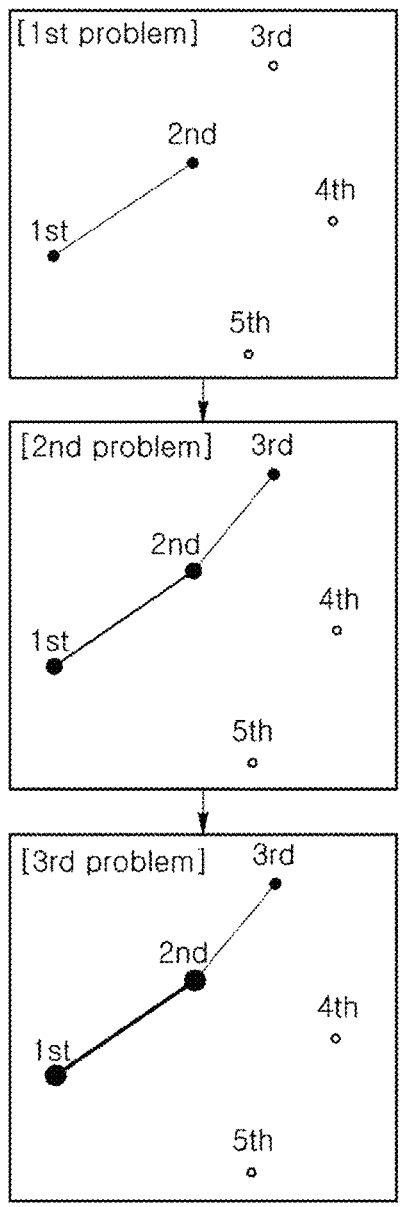

FIG. 10 depicts a screen visualized according to the visualization step of problem set's characteristic (S40) in the method for indicating characteristic of problem set according to the third embodiment of the present invention.

Figure 11:
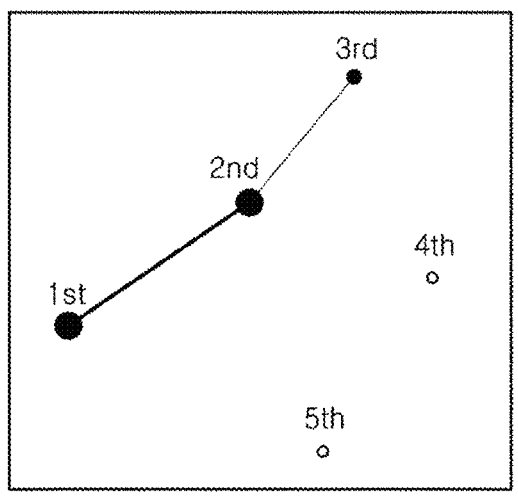

FIG. 11 depicts a screen visualized according to the visualization step of problem set's characteristic (S40) in the method for indicating characteristic of problem set according to the fourth embodiment of the present invention.

Figure 12:
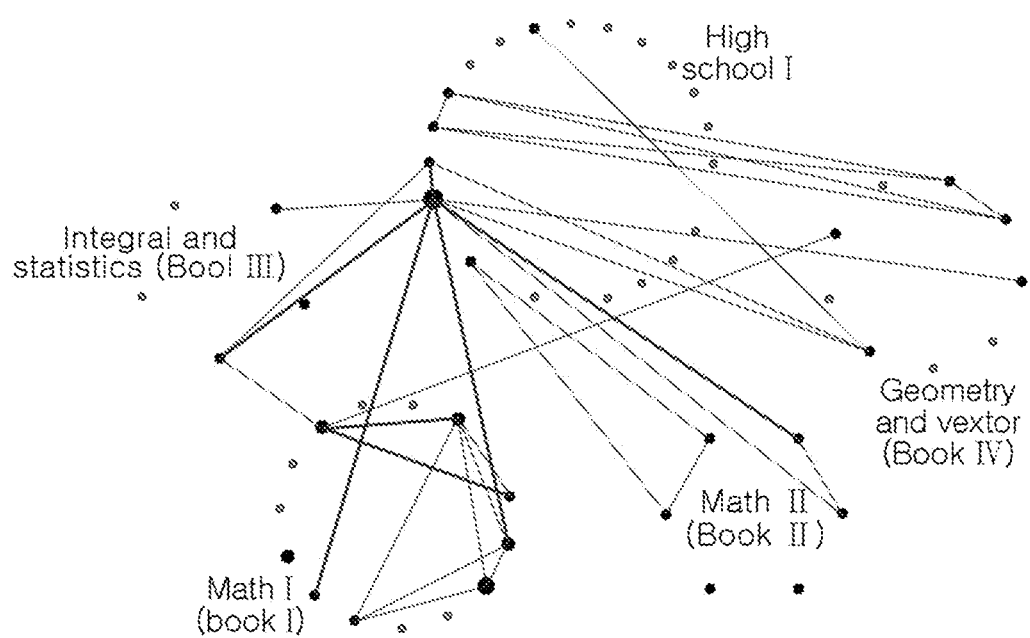

FIG. 12 depicts a specific example of a screen visualized according to the visualization step of problem set's characteristic (S40) in the method for indicating characteristic of problem set according to the fourth embodiment of the present invention.

FIG. 13 is a drawing for explaining how the marking result of the problem set is provided, in the method for indicating characteristic of problem set according to the fifth embodiment of the present invention.

Figure 14:
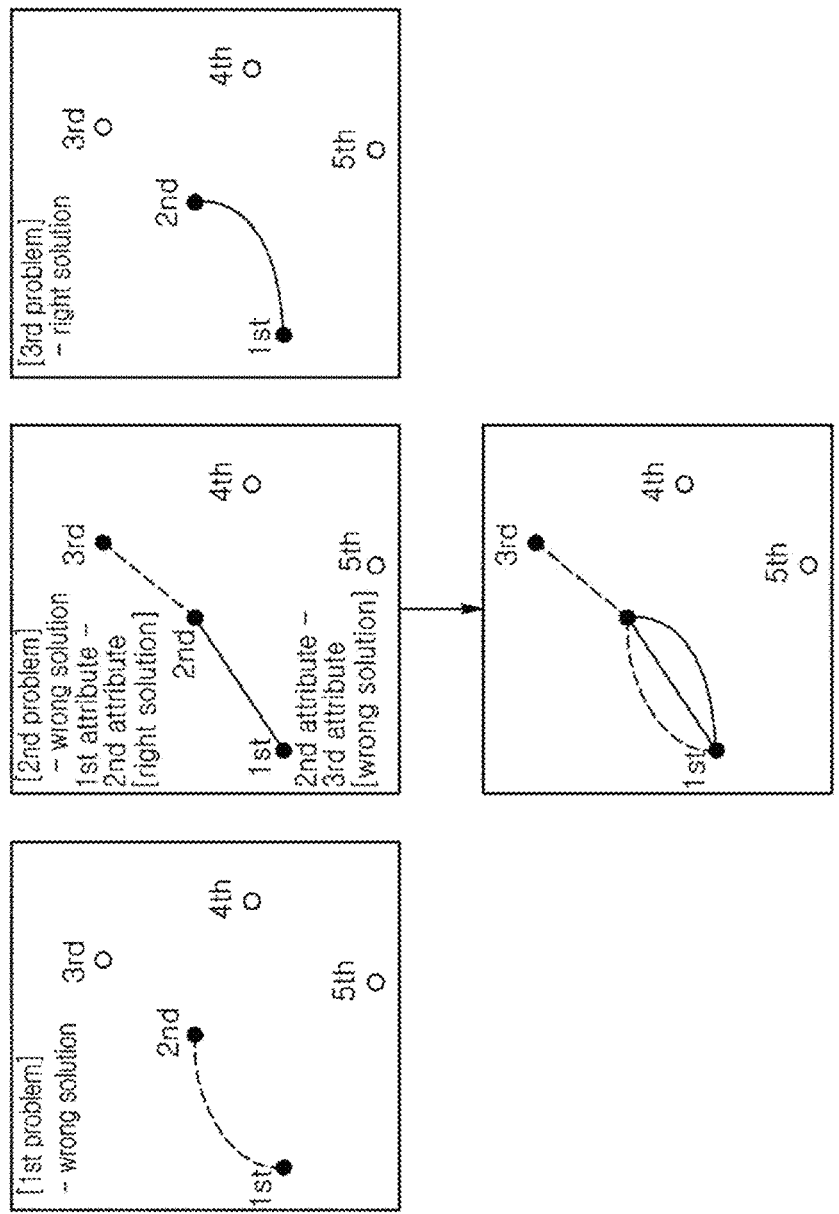

FIG. 14 depicts a screen visualized according to the visualization step of problem set's characteristic (S40) in the method for indicating characteristic of problem set according to the fifth embodiment of the present invention.

Figure 15:
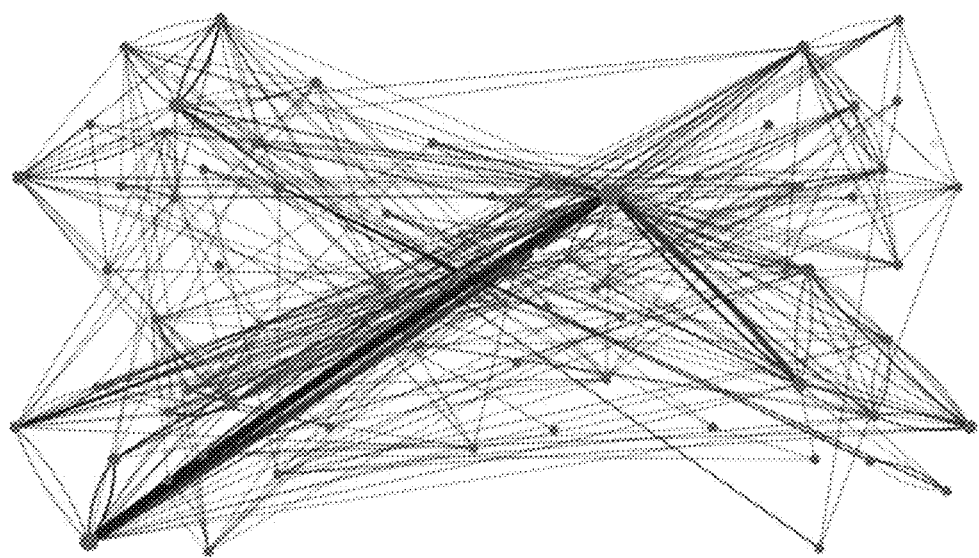

FIG. 15 depicts a specific example of a screen visualized according to the visualization step of problem set's characteristic (S40) in the method for indicating characteristic of problem set according to the fifth embodiment of the present invention.

Figure 16:
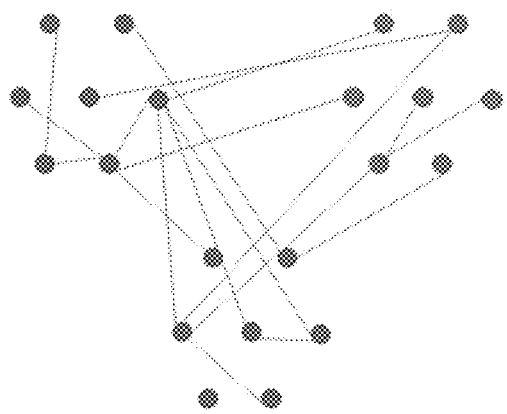

FIG. 16 depicts a fixed type embodiment in the method for indicating characteristic of problem set according to the sixth embodiment of the present invention.

Figure 17:
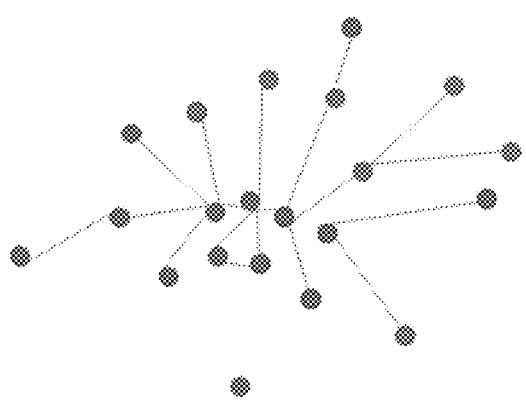

FIG. 17 depicts a movable type embodiment in the method for indicating characteristic of problem set according to the seventh embodiment of the present invention.

Figure 18:
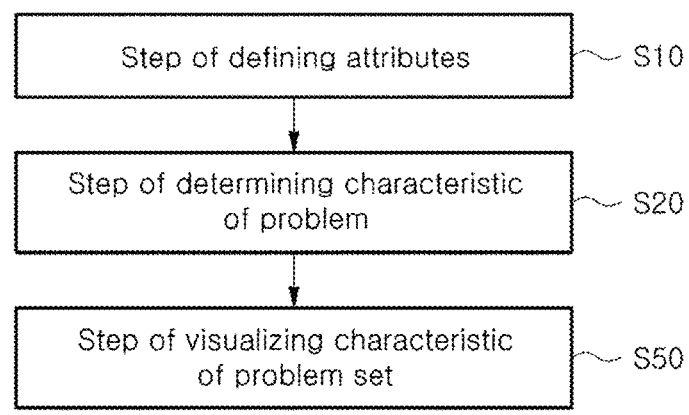

FIG. 18 is a flow chart of the method for indicating characteristic of problem according to one embodiment of the present invention.

Figure 19:
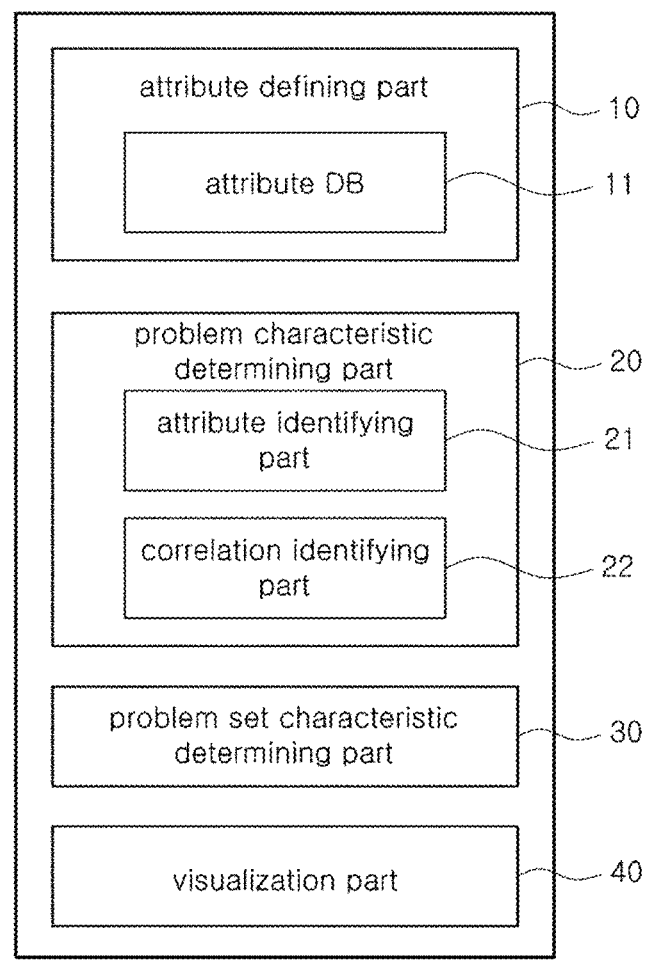

FIG. 19 depicts a schematic configuration of a system for indicating characteristic of problem and characteristic of problem set according to one embodiment of the present invention.

DETAILED DESCRIPTION

Embodiments of the present invention will be described hereinafter with reference to the accompanying drawings, in which some embodiments are shown. Advantages and features of some embodiments and methods of accomplishing the same are hereinafter detailed with reference to the accompanying drawings. The present invention is embodied in different forms and should not be construed as limited to the embodiments set forth herein. Rather, these embodiments are provided so that this disclosure shall be thorough and complete, and shall fully convey the scope of the present invention to those skilled in the art. The present invention is only defined by the category of the following claims. The same reference numbers indicate the same components throughout the specification.

Unless defined otherwise, all technical and scientific terms used herein have the same meaning as commonly understood by those skilled in the art to which the present invention belongs. Further, unless defined otherwise, all terms defined in generally used dictionaries may not be overly interpreted.

The terms used in the present disclosure are merely for illustration of embodiments, and are not for limiting the present invention. In this disclosure, the use of the terms "a" and "an" and "the" and similar referents in the context of describing the present invention is to be construed to cover both the singular and the plural, unless indicated otherwise. The term "comprising" is to be construed as open-ended terms (i.e., meaning "including, but not limited to,") unless otherwise indicated.

Hereinafter, the method for indicating characteristic of problem and problem set according to embodiments of the present invention will be described with reference to the drawings. The method for indicating characteristic of problem set will be described first, and then the method for indicating characteristics of problems will be described.

The method for indicating characteristic of problem set according to the first embodiment of the present invention will be set forth with reference to FIGS. 1 to 8 in the followings. When referring to FIG. 1, a flow chart of the method for indicating characteristic of problem set according to the first embodiment of the present invention is described, and when referring to FIG. 2, a detailed flow chart of a step (S20) of determining characteristics of problems of FIG. 1 is described. When referring to FIG. 3, a drawing for describing a step (S30) of determining characteristic of problem set of FIG. 1 is described, and when referring to FIGS. 5 and 6, a screen displayed according to a step (S40), which visualizes characteristic of problem set of FIG. 1 is described. When referring to FIGS. 7 and 8, a detailed embodiment of a screen displayed according to a step (S40), which visualizes characteristic of problem set of FIG. 1 is described.

However, in some embodiments, a method for indicating characteristic of problem set, which includes less steps or more steps than the steps depicted in FIG. 1 can be carried out.

In the method for indicating characteristic of problem set according to the first embodiment of the present invention, the problem set only needs to include a plurality of problems, and there is no other limitation. For example, the problem set can be a problem sheet edited for one time use such as a problem sheet of the college scholastic ability test, but is not limited thereto. The problem set can be defined as a plurality of problems selected for analysis. A plurality of problems that a learner has already finished solving can also be a problem set.

Because the problem set includes a plurality of problems, the characteristic of the problem set can be determined as a union of characteristics of all problems included in the problem set. As such, because the characteristic of the problem set can be defined as a union of characteristics of all problems included in the problem set, the characteristic of the problem set can be understood as an extended concept of the below described characteristic of problem, and can include a union concept.

According to the method for indicating characteristic of problem set according to present embodiment, since it is possible to correctly indicate the characteristic of the problem set including a plurality of problems, it becomes possible to easily understand the tendency of the problem set and so forth. For example, the method for the present embodiment can be used to understand a learning history of a learner.

In the meantime, for convenience of explanation, examples of math problems or a problem set including math problems are made for explaining the method for indicating characteristic of problem set according to the present embodiment, but it is apparent to those skilled in the art that the method for indicating characteristic of problem set according to the present embodiment is not applied only to the math problem set, but it can be applied to various subjects such as literature or English, and it can also be applied to various subjects, which are not included in a curriculum.

First, with reference to FIG. 1, attributes can be defined (S10). More specifically, a plurality of attributes can be defined for expressing characteristics of problems included in a problem set.

Characteristics of problems can be expressed using attributes. The attributes can be evaluation elements that the problem maker tries to evaluate through the problems, or can be defined as specified elements which are expected to be necessary for a learner to solve the problem set or problems, but are not limited thereto. Here, attributes are directed, for example, to concepts that are used or learned in related subjects, or to learners' ability (for example, ability in memory work, understanding and application), or to chapters of a subject, or to specific terms or expressions constituting problems, but are not limited thereto as long as they meet the definition described above.

Also, the attributes defined in the present step (S10) are not just for expressing a characteristic of one problem. The union of attributes for expressing characteristics of all problems included in the problem set or characteristics of all problems which can be made with regard to the subjects or chapters related to the problem set, can be defined. For this, in the present step (S10), a plurality of attributes can be defined.

A step for defining a plurality of attributes can consider subjects, chapters and so on of the problems included in the problem set. In case the problems included in the problem set are math problems, a plurality of attributes can be defined as a plurality of attributes related with math. For example, sequence, limit, similarity of figures and so on can be defined as a part of a plurality of attributes, but are not limited thereto.

The method for indicating characteristic of problem set according to present embodiment can be implemented, for example, by a system indicating characteristics of problems or characteristic of problem set described below. Therefore, the attributes defined in the present step (S10), can be indicated as corresponding codes. Here, the codes can be formed as combination of characters, numbers and so on, but are not limited thereto. For example, the code corresponding to the equation and inequality can be "C426," and the code corresponding to the sequence can be "C382," but is not limited thereto.

In some embodiments, with regard to each subject or each chapter, a plurality of attributes can be defined and saved in advance. In such a case, the present step (S10) can be skipped while implementing the method for indicating characteristic of problem set according to the present embodiment.

Subsequently, with reference to FIG. 1, the characteristic of each problem included in the problem set can be determined (S20). Specifically, the characteristic of each problem can be determined by attributes related with each problem and correlations between the attributes.

In the present step (S20), with regard to all problems included in the problem set, the characteristic of each problem can be determined. That is, for each problem, the present step (S20) can be repeated, and the characteristic of each problem can be determined by attributes related with each problem and correlations between the attributes. Specifically, in case the number of attributes related with certain problem is more than one and the number of correlations between the attributes is more than one, the characteristic of that problem can be determined as a union of attributes related with that problem and a union of the correlations between the attributes.

Figure 2:
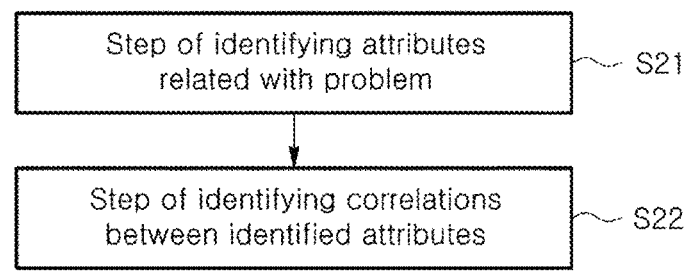
FIG. 2 is a specific flow chart of the problem characteristic determining step (S20) of FIG. 1.

For this, with reference to FIG. 2, the present step (S20) can include a step (S21) for identifying attributes related with problems and a step (S22) for identifying correlations between the identified attributes.

Figure 3:
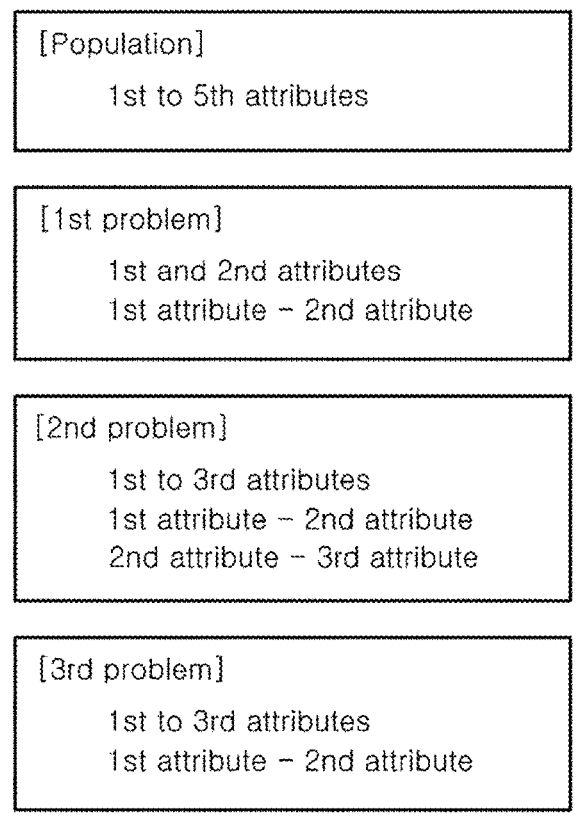
FIG. 3 is a drawing for explaining the problem characteristic determining step (S20) of FIG. 1.

First, with reference to FIGS. 2 and 3, with regard to each problem, attributes related with each problem can be identified (S21).

Here, attributes related with each problem are selected since they are identified as being related with each problem among a plurality of attributes defined in the previous step (S10). The description that some attributes are related with a problem can mean that those attributes are necessary for a learner to solve the problem or that those attributes are used in the formation of the problem. Here, in case that the number of attributes related with each problem is more than one, a plurality of attributes can be identified.

For example, with reference to FIG. 3, in case a plurality of attributes constituting the population are defined as including the first to fifth attributes, the first attribute and the second attribute can be identified as being related with the first problem among the first to fifth attributes. Also, with regard to the second and third problems, the first to third attributes can be identified.

With reference to FIGS. 2 and 3, in case the number of identified attributes is more than one, the correlations between the identified attributes can be identified (S22).

Here, the correlations between the identified attributes can be found by determining whether there exist correlated attributes between attributes related with the problem. In case a plurality of attributes need to be applied at the same or different time in order to solve the problem, it can be defined that these plurality of attributes are correlated with one another. Further, in case a plurality of attributes need to be applied at the same or different time in order to create the problem, it can be defined that these plurality of attributes are correlated with one another. Therefore, according to the method for the present embodiment, the analysis can be conducted not only by using the attributes, but also by using the correlations between the attributes, which leads to a more precise analysis result.

For example, with reference to FIG. 3, it can be identified that the first attribute and the second attribute are correlated with each other, with regard to the first problem.

Between identified attributes, a plurality of correlations may be found. In this case, after finding the plurality of correlations between the identified attributes, the characteristic of a problem can be determined by the identified attributes and the plurality of correlations. For example, with reference to FIG. 3, it can be found that there exists correlation between the first attribute and the second attribute, and that these exists correlation between the second attribute and the third attribute.

As described in the above example, the correlation can exist only between parts of identified attributes. For example, with reference to FIG. 3, the correlation between the first attribute and the second attribute can exist, and the correlation between the second attribute and the third attribute can exist, but the correlation between the first and the third attribute does not exist, with regard to the second problem.

In the meantime, in some embodiments, when a plurality of attributes are identified, the correlations can exist between all of the identified attributes. For example, in case the first to third attributes are identified, which are related with a specific problem, the correlations can exist between all combinations of the first to third attributes. That is, all of the correlations between the first attribute and the second attribute, between the second attribute and the third attribute and between the third and the first attribute exist.

It should be noted that when there is only one attribute related with a problem, the correlation cannot exist. Only when there exist a plurality of attributes, the correlation can be found. For example, when there is only one attribute related with a problem, the characteristic of this problem can be determined only by the attribute related with the problem.

According to the method for indicating characteristic of problem set according to the first embodiment of the present invention, the characteristic of each problem can be more precisely indicated, since the correlations between the identified attributes are used in determining the characteristic of each problem.

Subsequently, with reference to FIG. 1, the characteristic of a problem set can be determined (S30). More specifically, the characteristic of a problem set can be determined as a union of characteristics of all problems included in the problem set. The characteristic of the problem set can be determined by the attributes related with all problems and the correlations between the attributes.

In the method for indicating characteristic of problem set according to the present embodiment, the characteristic of problem set can be determined as a union of attributes of each problem. Since the characteristic of a problem is determined by the attributes related with the problem and the correlations between the attributes, the characteristic of problem set including a plurality of problems is not merely comprised of a union of the attributes, but can include a union of all correlations included in the characteristic of each problem.

For example, with reference to FIG. 4, the characteristic of problem set can be determined as a union of characteristics of the first to the third problems. That is, the characteristic of problem set can be determined to include the information regarding a union of related attributes included in the characteristics of the first to the third problems and the information regarding a union of correlations of the attributes.

Therefore, according to the method for indicating characteristic of problem set according to the first embodiment of the present invention, it can be easily noted how a problem included in the problem set is structured through the characteristic of the problem set. A more specific information than prior art technology is available.

Subsequently, with reference to FIG. 1, the determined characteristic of problem set can be visualized on a screen (S40).

Specifically, the attributes included in the determined characteristic of problem set are indicated as points on a screen and the correlations between the attributes are indicated as lines on a screen, when the determined characteristic of problem set is visualized on a screen. Here, the attributes can be indicated on a screen, for example, as points on a screen, but are not limited thereto. They can also be indicated by various marks other than a point.

Figure 5:
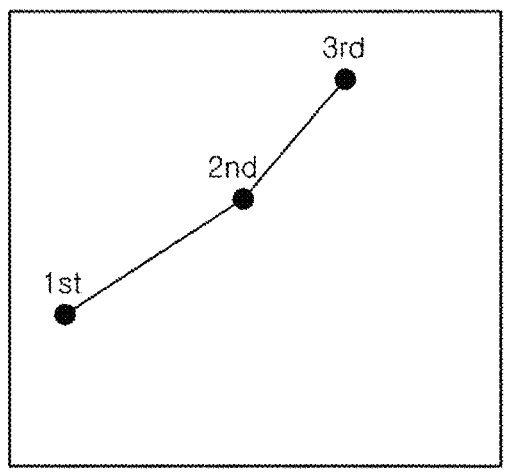
FIGS. 5 and 6 depict screens visualized according to the visualization step of problem set's characteristic (S40) of FIG. 1.

For example, with reference to FIG. 5, the first to the third attributes, which are included in the characteristic of problem set of FIG. 4, can be indicated as points on a screen. Also, as correlations between the attributes, the correlation between the first attribute and the second attribute and the correlation between the second attribute and the third attribute can be indicated as lines on a screen.

Therefore, according to the method for indicating characteristic of problem set according to the first embodiment of the present invention, a learner or a user can easily note the characteristic of problem set through the visualized screen. That is, a learner or a user can easily understand which attributes are used in the problem set and how the attributes are combined with each other for use.

In a step of visualizing the determined characteristic of problem set on a screen (S40), it is not limited to indicate only the attributes included in the determined characteristic of problem set on a screen. It is also possible to indicate all of attributes defined in the attribute defining step (S10) on a screen other than the attributes included in the determined characteristic of problem set.

Figure 6:
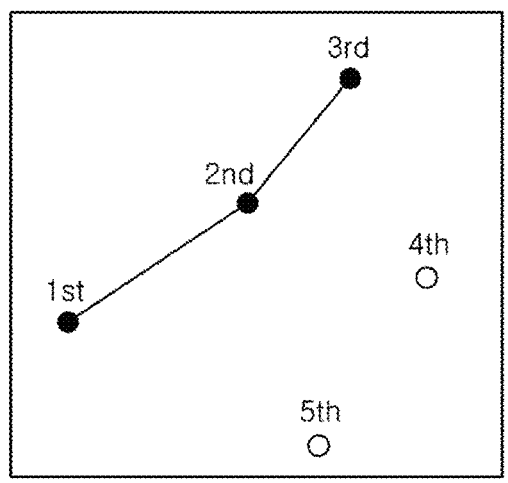

For example, with reference to FIG. 6, the fourth and the fifth attributes can be indicated on a screen other than the first to third attributes included in the characteristic of the problem set of FIG. 4. However, in some embodiment, the attributes which are not included in the characteristic of problem set can be indicated differently from the attributes which are included in the characteristic of problem set.

As such, according to the method for indicating characteristic of problem set according to the first embodiment of the present invention, the characteristic of problem set can be correctly indicated through the correlations between attributes, and such characteristic of problem set can be visualized, thus a learner or a user can intuitively understand the characteristic of problem set.

Figure 7:
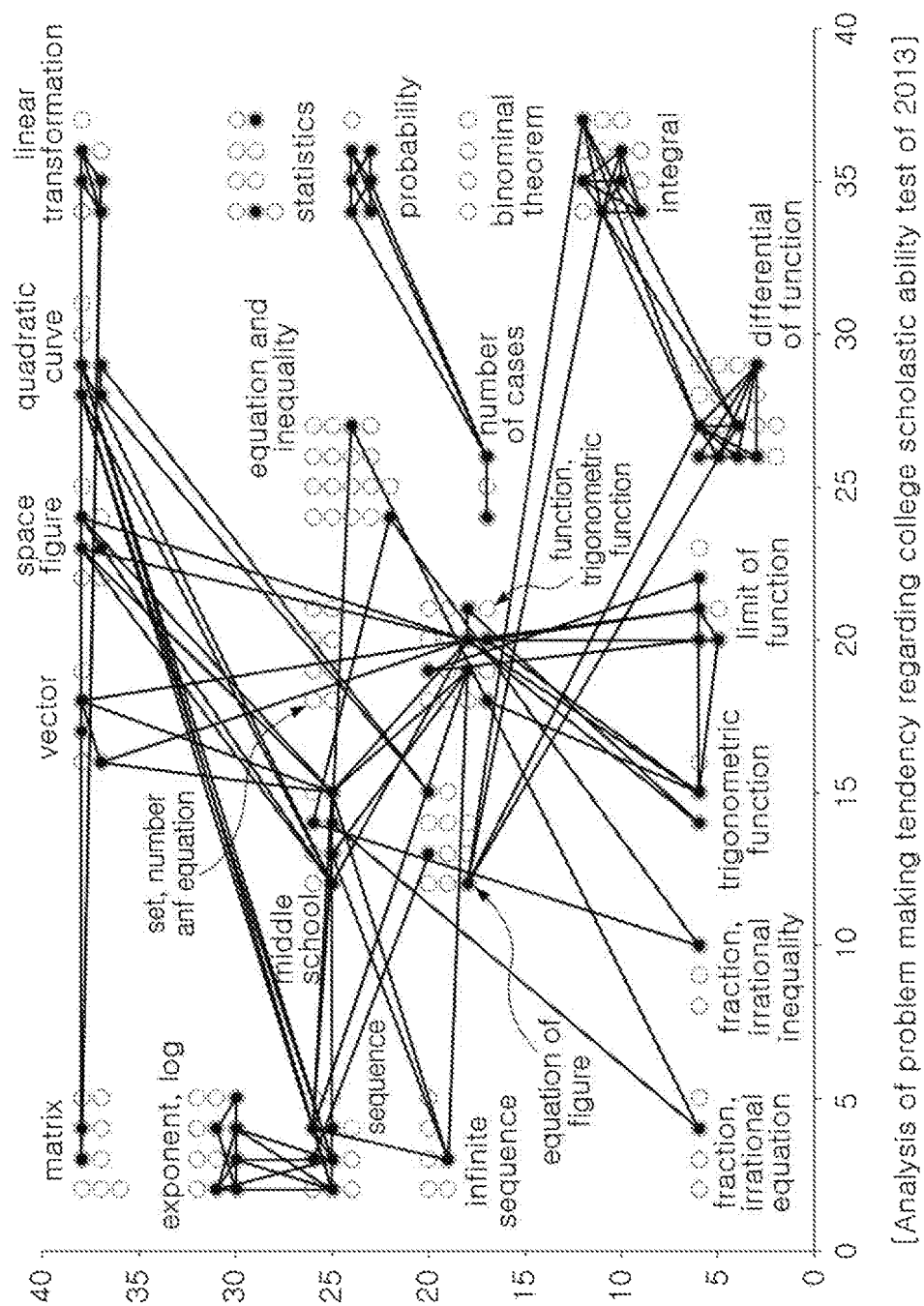
Figure 8A:
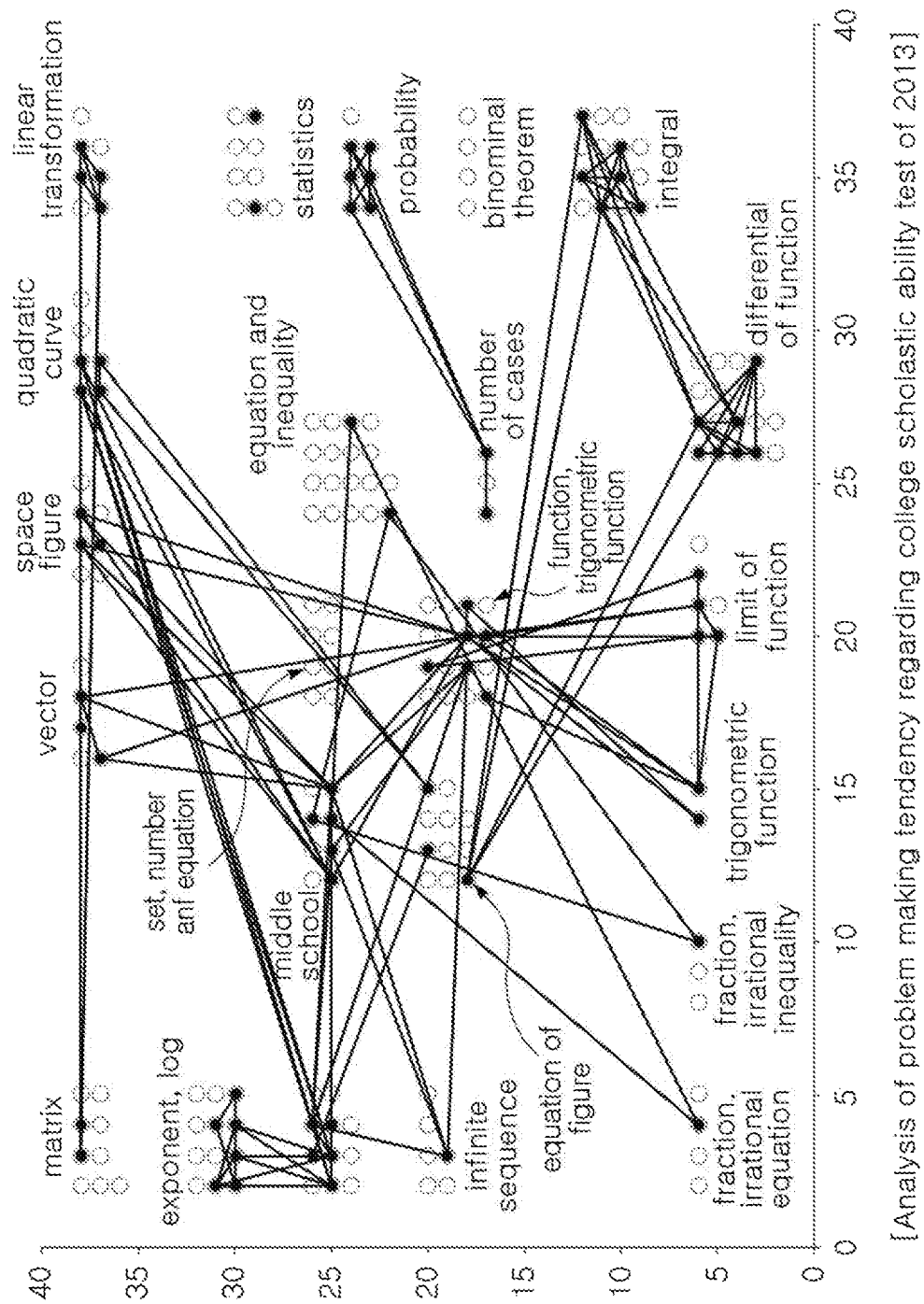
Figure 8B:
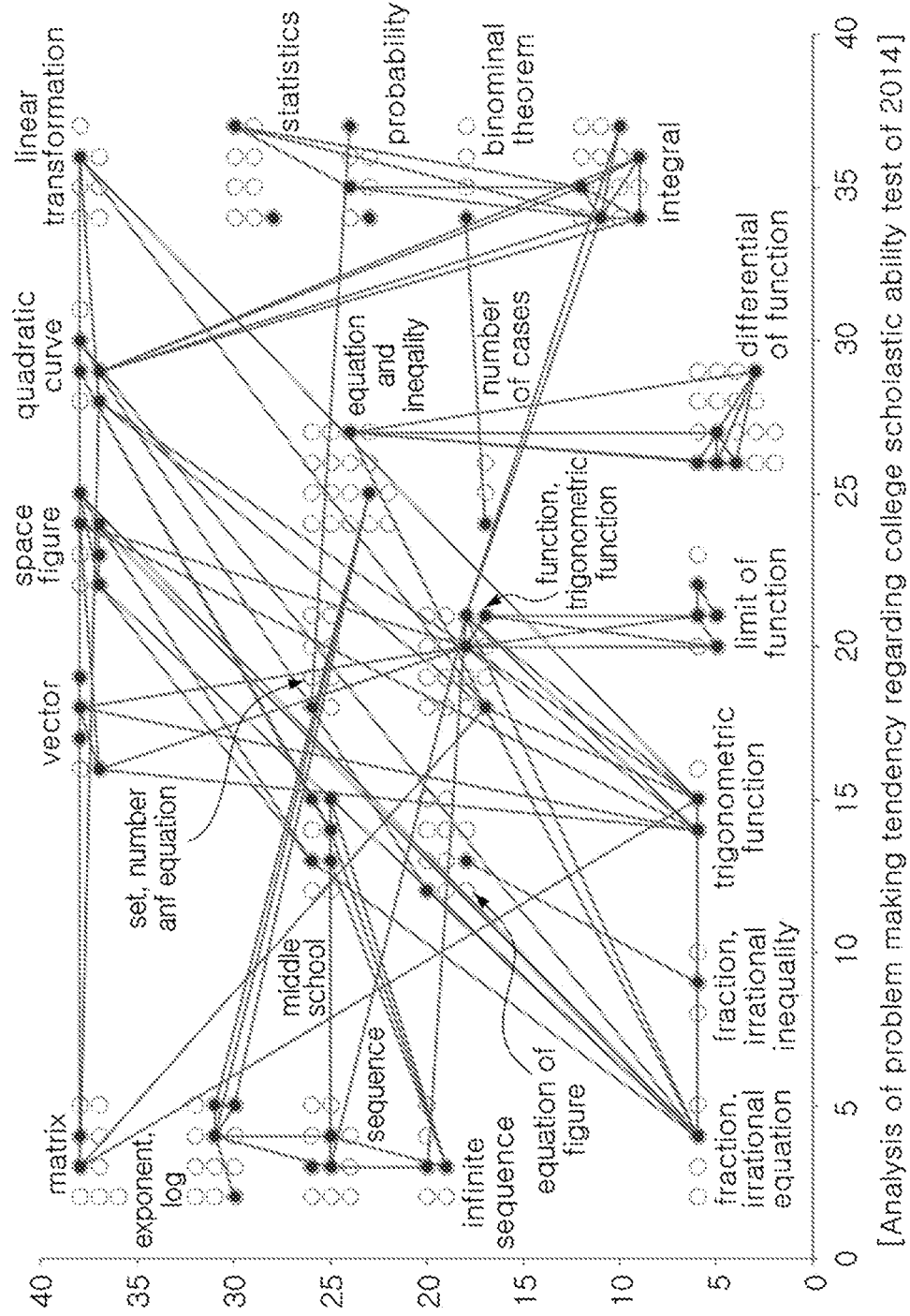
Figure 8C:
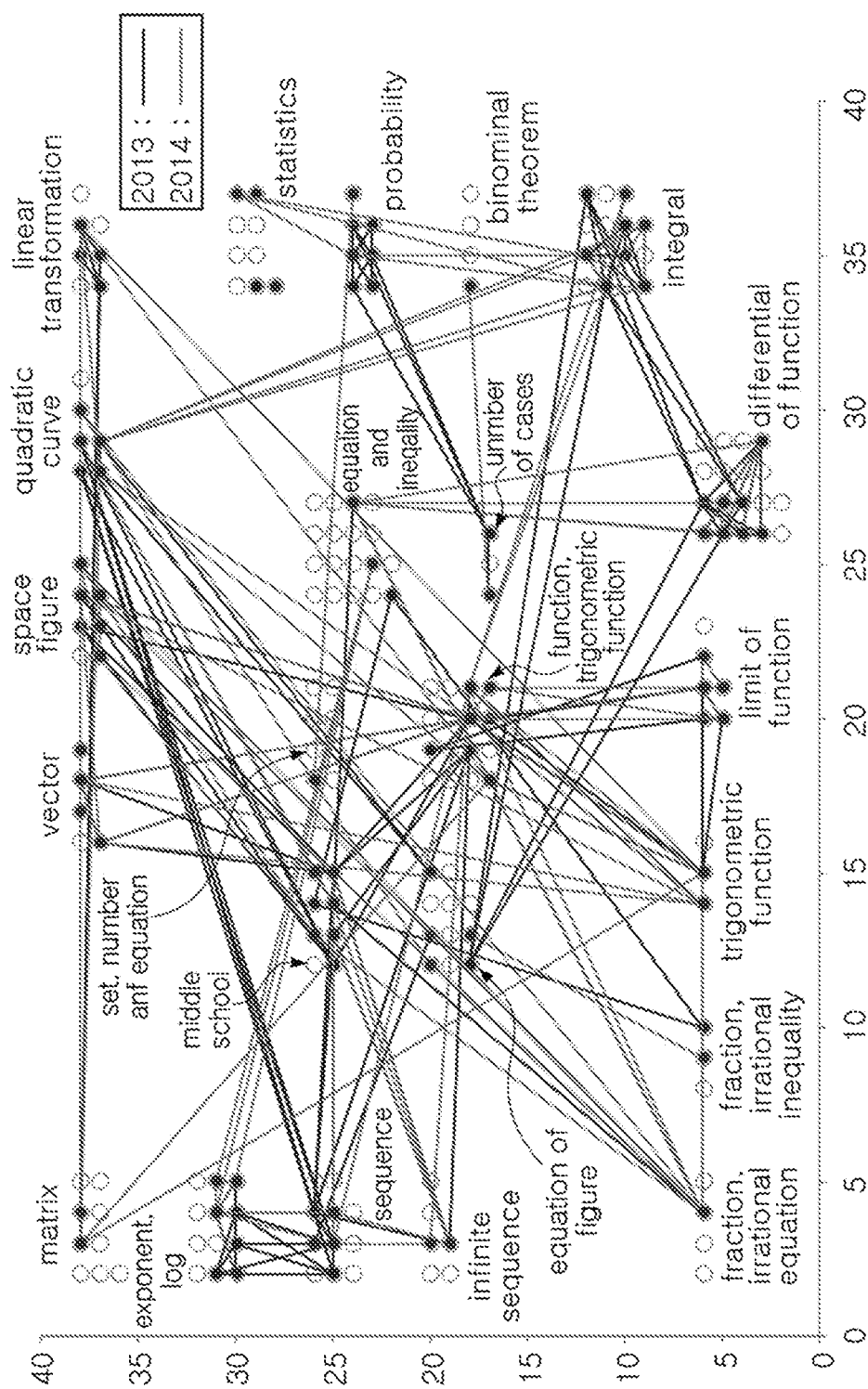

Specifically, with reference to FIG. 7, the characteristic of problem set analyzed according to the method for indicating problem set according to the first embodiment of present invention, is depicted. According to this, it can be easily and visually understood which attributes and correlations between attributes are used in the college scholastic ability test of the year 2013.

Moreover, with reference to FIG. 8, in some embodiments the characteristics of a plurality of problem sets are visualized on a single screen. For this, after the determined characteristic of a problem set is visualized on a screen (S40), a step of simultaneously visualizing characteristic of the other problem set on the same screen can be added. In such a case, points or lines indicating the characteristic of each problem set can have its own color, thus characteristics of a plurality of problem sets can be noted on a single screen.

For example, with reference to FIG. 8, the characteristic of the college scholastic ability test of the year 2013 is indicated in blue color, and the characteristic of the college scholastic ability test of the year 2014 is indicated in red color. Therefore, according to the method for indicating characteristic of problem set according to the first embodiment of the present invention, comparison between the two different problem sets can be easily conducted.

Hereinafter, with reference to FIG. 9, the method for indicating characteristic of problem set according to the second embodiment of the present invention is described. Focus will be made to the different parts between the method for indicating characteristic of problem set according to the first and second embodiments of the present invention. With reference to FIG. 9, a screen is depicted in a step of visualizing characteristic of problem set (S40) in the method for indicating characteristic of problem set according to the second embodiment of the present invention.

Differently from the method for indicating characteristic of problem set according to the first embodiment of the present invention, in the step of visualizing determined characteristic of problem set, the attributes included in the determined characteristic of the problem set and the correlations between the attributes can be visualized on a screen in sequence in a unit of each problem's characteristic.

That is, in the method for indicating characteristic of problem set according to the second embodiment of the present invention, characteristics of all problems of a problem set are not simultaneously visualized on a screen at one time, but a characteristic of one problem of a problem set is visualized on a screen and a characteristic of the other problem in the same problem set is visualized thereafter.

For example, with reference to FIG. 9, in the order of the first, second and third problem, the characteristic of each problem included in a problem set can be sequentially displayed on a screen.

According to the method for indicating characteristic of problem set according to the second embodiment of the present invention, since the characteristics of problems are displayed separately from each other, the characteristic of each problem can be sequentially noted.

Hereinafter, with reference to FIG. 10, the method for indicating characteristic of problem set according to the third embodiment of the present invention is described. Focus will be made to the different parts between the method for indicating characteristic of problem set according to the second and third embodiments of the present invention. With reference to FIG. 10, a screen is depicted in a step of visualizing characteristic of problem set (S40) in the method for indicating characteristic of problem set according to the third embodiment of the present invention.

Differently from the method for indicating characteristic of problem set according to the second embodiment of the present invention, in the step of visualizing determined characteristic of problem set according to the method for indicating characteristic of problem set according to the third embodiment of the present invention, the attributes included in the determined characteristic of the problem set and the correlations between the attributes can be visualized on a screen accumulatively in a unit of each problem's characteristic.

Specifically, according to the frequency of accumulation of an attribute, the appearance of the point corresponding to the attribute can become different, and according to the frequency of accumulation of a correlation between attributes, the appearance of the line corresponding to the correlation can become different. Here, the appearance of the point can mean the size, shape, color and the like, and the appearance of the line can mean the thickness, shape, color and the like, but is not limited thereto.

For example, with reference to FIG. 10, in the order of the first, second and third problem, the characteristic of each problem included in a problem set can be displayed on a screen in accumulative manner. Accordingly, the size of the point corresponding to the first and second attributes, which are commonly defined as attribute in all problems, can become larger and larger, and the thickness of the line corresponding to the correlation between the first and second attributes, which are commonly defined as attribute in all problems, can become thicker and thicker.

According to the method for indicating characteristic of problem set according to the third embodiment of the present invention, the characteristic of problem set visually displayed on a screen can be accumulatively indicated, thus a learner or a user can easily and directly understand the frequency of the attributes and the frequency of the correlations between the attributes, which leads to a more precise and easier analysis of the characteristic of problem set.

Hereinafter, with reference to FIGS. 11 and 12, the method for indicating characteristic of problem set according to the fourth embodiment of the present invention is explained. The explanation will be focused on the difference from the method for indicating characteristic of problem set according to the second embodiment of the present invention. With reference to FIG. 11, a screen displayed according to the step of visualizing characteristic of problem set (S40) in the method for indicating characteristic of problem set according to the fourth embodiment of the present invention, is depicted. With reference to FIG. 12, a specified example of the screen displayed according to the step of visualizing characteristic of problem set (S40) in the method for indicating characteristic of problem set according to the fourth embodiment of the present invention, is depicted.

Differently from the method for indicating characteristic of problem set according to the first embodiment of the present invention, appearance of a point corresponding to a specific attribute becomes different according to the frequency of the specific attribute included in the determined problem set, and appearance of a line corresponding to a correlation between specific attributes becomes different according to the frequency of the correlation between the specific attributes included in the determined problem set, in the step of visualizing determined characteristic of problem set on a screen, according to the method for indicating characteristic of problem set according to the fourth embodiment of the present invention.

That is, with reference to FIG. 6, only the information on the presence of attributes and correlations between attributes can be obtained through the depicted screen, according to the method for indicating characteristic of problem set according to the first embodiment of the present invention.

In contrast, with reference to FIG. 11, not only the information on the presence of attributes, but also the information on how many times the attributes are included in the problem set, can be additionally obtained. Also, with reference to FIG. 11, not only the information on the presence of correlations between attributes, but also the information on how many times the correlations between attributes are included in the problem set, can be additionally obtained.

Specifically, with reference to FIG. 12, the characteristic of problem set analyzed according to the method for indicating characteristic of problem set according to the above-described fourth embodiment of the present invention is depicted. According to this, through the thickness of the line indicating the correlations between attributes, the importance of the correlations between attributes in the characteristic of problem set can be intuitively understood.

According to the method for indicating characteristic of problem set according to the fourth embodiment of the present invention, since the frequency of attributes and the frequency of correlations between attributes can be intuitively understood through the accumulative indication of characteristic of problem set, which is visually displayed on a screen, a more precise understanding of characteristic of problem set is possible.

When using the method for indicating characteristic of problem set according to the above-described embodiments of the present invention, since the characteristic of problem set learned by a learner can be indicated, the current status of a learner or the learning history of a learner can be visually understood.

Hereinafter, with reference to FIGS. 13 to 15, the method for indicating characteristic of problem set according to the fifth embodiment of the present invention is explained. The explanation will be focused on the difference from the method for indicating characteristic of problem set according to the first embodiment of the present invention. With reference to FIG. 13, a drawing is disclosed, which is for explaining how the marking result with respect to the problem set is provided, in the method for indicating characteristic of problem set according to the fifth embodiment of the present invention. With reference to FIG. 14, a screen displayed according to the step of visualizing characteristic of problem set (S40) in the method for indicating characteristic of problem set according to the fifth embodiment of the present invention, is depicted. With reference to FIG. 15, a specified example of the screen displayed according to the step of visualizing characteristic of problem set (S40) in the method for indicating characteristic of problem set according to the fifth embodiment of the present invention, is depicted.

With reference to FIGS. 1 and 13, in the method for indicating characteristic of problem set according to the fifth embodiment of the present invention, the marking result with respect to the problem set can be provided in the step of visualizing characteristic of problem set (S40) or in its prior steps. That is, when a specific learner solves a plurality of problems included in a problem set, the marking result according to the solving result can be provided.

According to this, with reference to FIG. 14, in the step of visualizing determined characteristic of problem set, correlations between attributes related with a problem, to which a learner made a right solution can be displayed as a line differently from a line representing correlations between attributes related with a problem, to which a learner made a wrong solution. Here, the appearance of a line means thickness, shape, color, or the like, but is not limited thereto.

For example, the correlations between attributes related with the third problem, which is found to be right solution according to the marking result, can be displayed as a blue line. Also, the correlations between attributes related with the first problem, which is found to be wrong solution according to the marking result, can be displayed as a red line. It should be noted that the color of a line corresponding to the correlation related with the problem of right solution only needs to be different from that of a line corresponding to the correlation related with the problem of wrong solution, thus the color is not limited to blue or red.

In some embodiments, the appearance of a line corresponding to correlations between attributes does not become different according to the result of right or wrong solution in a unit of problem. The right or wrong solution can be determined in a unit of correlation between attributes. For example, in a case that a user selects an answer identified when he or she does not correctly understand correlation between specific attributes, his or her selection may be found to be wrong solution with respect to the correlation between the specific attributes, but it may be found to be right solution with respect to correlation between different attributes in the same problem. For example, with reference to FIG. 14, the correlation between the first and second attributes may be found to be right solution, and the correlation between the second and third attributes may be found to be wrong solution, in the second problem. Through this, a precise analysis to a learner becomes possible.

Specifically, with reference to FIG. 15, the characteristic of problem set analyzed according to the method for indicating characteristic of problem set according to the above-described fifth embodiment of the present invention is depicted. According to this, strong or weak points of a learner can be easily distinguished from each other, through the color of lines indicating correlation between attributes.

As such, according to the method for indicating characteristic of problem set according to the fifth embodiment of the present invention, the color of lines corresponding to the correlations related with the problem of right solution differs from the color of lines corresponding to the correlations related with the problem of wrong solution. Thus, when focusing on the color of lines related with the problem of wrong solution, the weak points of a learner can be easily identified. Moreover, it can be easily identified how many times a learner made right or wrong solutions with respect to a single correlation, thus a more precise analysis of a learner becomes possible.

Hereinafter, with respect to FIG. 16, the method for indicating characteristic of problem set according to the sixth embodiment of the present invention is explained. The explanation will be focused on the difference from the method for indicating characteristic of problem set according to the first embodiment of the present invention. With reference to FIG. 16, a fixed type embodiment according to the method for indicating characteristic of problem set according to the sixth embodiment of the present invention is depicted.

With reference to FIG. 16, in the method for indicating characteristic of problem set according to the sixth embodiment of the present invention, the attributes are indicated as points in predetermined locations on a screen.

That is, when the population of the attributes are determined, it can be determined on which location of a screen the point corresponding to each attribute is indicated. As such, the characteristic of problem set can be visualized while the location of a point corresponding to specific attribute is fixed.

Therefore, according to the method for indicating characteristic of problem set according to the sixth embodiment of the present invention, when comparison is made between different problem sets, different problem sets can be indicated in identical coordinates. Thus, with reference to FIG. 8, the above-described fixed type visualization facilitates comparison between different problem sets.

Hereinafter, with respect to FIG. 17, the method for indicating characteristic of problem set according to the seventh embodiment of the present invention is explained. The explanation will be focused on the difference from the method for indicating characteristic of problem set according to the sixth embodiment of the present invention. With reference to FIG. 17, a movable type embodiment according to the method for indicating characteristic of problem set according to the seventh embodiment of the present invention is depicted.

According to the method for indicating characteristic of problem set according to the seventh embodiment of the present invention, in a step of visualizing determined characteristic of problem set, the location of a point corresponding to specific attribute can be variable, non-fixed type or movable on a screen. For example, the attributes having a lot of correlations or found to be important can be indicated as collection of points on a screen. Also, the frequently included attributes may be indicated collectively in the middle of a screen. That is, the location of a point corresponding to specific attribute is not fixed on a screen, thus the visualization according to characteristic of each problem set becomes easier for a user to understand.

Hereinafter, with respect to FIG. 18, the method for indicating characteristic of problem set according to one embodiment of the present invention is explained. The explanation will be focused on the difference from the method for indicating characteristic of problem set according to the first embodiment of the present invention. With reference to FIG. 18, a flow chart of the method for indicating characteristic of problem set according to one embodiment of the present invention is depicted.

According to the method for indicating characteristic of problem set according to one embodiment of the present invention, as depicted in FIG. 18, a plurality of attributes, which are for expressing characteristic of problem, can be identified (S10).

However, it should be noted that the attributes defined in this step (S10) are not for expressing characteristic of a specific problem. In this step (S10), a population of attributes can be defined for expressing characteristics of all problems, which can be set as exam problems with respect to a subject or a topic related with those problems. For this, a plurality of attributes can be defined in this step (S10).

Thereafter, with reference to FIG. 18, characteristic of problem can be determined (S20). Specifically, characteristic of problem can be determined by attributes related with the problem and correlations between the attributes.

Thereafter, with reference to FIG. 18, determined characteristic of problem can be visualized on a screen (S50). For this, various technologies which can be used in visualizing (S40) determined characteristic of problem set on a screen.

Therefore, according to the method for indicating characteristic of problem according to one embodiment of the present invention, both of attributes related with the problem and the correlations between attributes are considered to determine characteristic of the problem, thus precise analysis regarding the characteristic of problem becomes possible. Moreover, according to the method for the present embodiment, since the determined characteristic of problem is expressed visually, intuitive analysis of problem becomes possible.

Hereinafter, with reference to FIG. 19, the method for indicating characteristic of problem and characteristic of problem set according to one embodiment of the present invention is explained. The explanation will be focused on the difference from the method for indicating characteristic of problem set according to the embodiments of the present invention. With reference to FIG. 19, schematic configuration of a system indicating characteristic of problem and characteristic of problem set according to one embodiment of the present invention is depicted.

With reference to FIG. 19, the system of indicating characteristic of problem and characteristic of problem set according to one embodiment of the present invention comprises an attribute defining part (10), a problem characteristic determining part (20), a problem set characteristic determining part (30) and a visualization part (40). It should be noted that in some embodiments a system of indicating characteristic of problem and characteristic of problem set having elements less or more elements than the embodiment depicted in FIG. 19 can be implemented. Also, the method for indicating characteristic of problem set according to the embodiments of the present invention can be implemented by the system of indicating characteristic of problem and characteristic of problem set according to one embodiment of the present invention.

The attribute defining part (10) can define a plurality of attributes for expressing characteristic of problems included in problem set or for expressing characteristic of problem. The defined plurality of attributes can be stored in an attribute database (11) included in the attribute defining part (10).

In some embodiments, a plurality of attributes can be pre-stored in the attribute database (11), but is not limited thereto.

The problem characteristic determining part (20) can determine characteristic of each problem included in problem set, or can determine characteristic of a single problem. The characteristic of each problem can be determined by attributes related with the problem and correlations between the attributes.

Specifically, the problem characteristic determining part (20) can include an attribute identifying part (21), which identifies attributes related with problem, and a correlation identifying part (22), which identifies correlations between identified attributes.

The problem set characteristic determining part (30) can determine characteristic of problem set. It determines characteristic of problem set as a union of characteristics of all problems included in the problem set. The characteristic of problem set can be determined by attributes related with all problems and correlations between the attributes.

The visualization part (40) can visualize determined characteristic of problem set or characteristic of problem on a screen (not depicted).

The embodiments of the present invention are described with reference to the accompanying figures, but a person having ordinary skill in the field of the present invention may understand that the present invention can be implemented differently without changing the technical concept or essential elements. Therefore, the above-described embodiments are exemplary and not restrictive in all aspects.

What is claimed is:

1. A method performed in a system for indicating a characteristic of a problem set including a plurality of problems, the method comprising the steps of:
    defining a plurality of attributes for expressing characteristics of the problems included in the problem set, wherein the plurality of defined attributes are stored in an attribute database included;
    determining characteristics of the problems included in the problem set, wherein the characteristic of each of the problems is determined by attributes related with each of the problems and correlations between the attributes;
    determining a characteristic of the problem set as a union of the characteristics of all the problems included in the problem set, wherein the characteristic of the problem set is determined by attributes related with all the problems and correlations between the attributes; and
    visualizing the determined characteristic of the problem set on a screen,
    wherein the step of determining the characteristics of the problems comprises the steps of:
    identifying attributes related with each of the problems; and
    identifying correlations between the identified attributes in case a number of the identified attributes is larger than one, and
    wherein the step of visualizing comprises:
    displaying a plurality of points corresponding to the attributes related with each of the problems;
    displaying lines, each of the lines connected between two points of the plurality of points and corresponding to a correlation between two identified attributes; and
    dynamically changing a thickness of each of the lines based on a frequency of the correlation corresponding to each of the lines being included in the determined characteristic of the problem set.

2. The method according to claim 1, wherein in the step of determining the characteristics of the problems, the attributes related with each of the problems are selected as attributes related with each of the problems among the plurality of defined attributes.

3. The method according to claim 1, wherein an appearance of a point corresponding to a specific attribute varies with a frequency of the specific attribute being included in the determined characteristic of the problem set.

4. The method according to claim 1, wherein in the step of visualizing the determined characteristic of the problem set, attributes included in the determined characteristic of the problem set and correlations between the corresponding attributes are visualized on the screen in a sequential manner by the characteristic of each of the problems.

5. The method according to claim 1, wherein in the step of visualizing the determined characteristic of the problem set, attributes included in the determined characteristic of the problem set and correlations between the corresponding attributes are visualized on the screen in an accumulative manner by the characteristic of each of the problems.

6. The method according to claim 5, wherein an appearance of a point corresponding to a specific attribute varies with a frequency of the specific attribute being accumulated.

7. The method according to claim 1, wherein in the step of visualizing the determined characteristic of the problem set, the attributes included in the determined characteristic of the problem set are indicated as points on the screen in locations predetermined for the corresponding attributes.

8. The method according to claim 1, wherein in the step of visualizing the determined characteristic of the problem set, the attributes included in the determined characteristic of the problem set are indicated as points on the screen in variable locations.

9. The method according to claim 1, wherein an appearance of a line corresponding to a correlation between attributes related with a problem to which a learner gives a right answer differs from an appearance of a line corresponding to a correlation between attributes related with a problem to which the learner gives a wrong answer.

10. A method performed in a system for indicating a characteristic of a problem set including a plurality of problems, the method comprising the steps of:
    defining a plurality of attributes for expressing characteristics of the problems included in the problem set, wherein the plurality of defined attributes are stored in an attribute database;
    determining characteristics of the problems included in the problem set, wherein the characteristic of each of the problems is determined by attributes related with each of the problems and correlations between the attributes;
    determining a characteristic of the problem set as a union of the characteristics of all the problems included in the problem set, wherein the characteristic of the problem set is determined by attributes related with all the problems and correlations between the attributes; and
    visualizing the determined characteristic of the problem set on a screen, wherein the step of determining the characteristics of the problems comprises the steps of:
identifying attributes related with each of the problems; and
identifying correlations between the identified attributes in case a number of the identified attributes is larger than one, and
wherein the step of visualizing comprises:
displaying a plurality of points corresponding to the attributes related with each of the problems;
displaying a first line connected between a first point and a second point among the plurality of points based on a correlation related to the characteristic of a first problem;
displaying a second line connected between the first point and the second point based on a correlation related to the characteristic of a second problem;
displaying the first line in a first color in response to a learner giving a right answer to the correlation related to the characteristic of the first problem; and
displaying the second line in a second color different from the first color in response to the learner giving a wrong answer to the correlation related to the characteristic of the second problem.

11. The method of claim 10, further comprising:
dynamically changing a thickness of the first line in response to the learner giving a right answer to a correlation related to the characteristic of a third problem, the correlation related to the characteristic of the third problem being a correlation between an attribute corresponding to the first point and an attribute corresponding the second point.

12. The method of claim 10, further comprising:
dynamically changing a thickness of the second line in response to the learner giving a wrong answer to a correlation related to the characteristic of a third problem, the correlation related to the characteristic of the third problem being a correlation between an attribute corresponding to the first point and an attribute corresponding the second point.

* * * * *